(12) United States Patent
Hubbard

(10) Patent No.: US 11,455,658 B1
(45) Date of Patent: Sep. 27, 2022

(54) ARTIFICIALLY INTELLIGENT CAMPAIGN CREATION AND DEPLOYMENT SYSTEM

(71) Applicant: Robert B. Hubbard, Burlington, KY (US)

(72) Inventor: Robert B. Hubbard, Burlington, KY (US)

( * ) Notice: Subject to any disclaimer, the term of this patent is extended or adjusted under 35 U.S.C. 154(b) by 0 days.

(21) Appl. No.: 17/382,733

(22) Filed: Jul. 22, 2021

Related U.S. Application Data

(63) Continuation-in-part of application No. 16/814,746, filed on Mar. 10, 2020, now abandoned.

(51) Int. Cl.
  G06Q 30/02 (2012.01)
  G06N 5/04 (2006.01)
  H04L 67/02 (2022.01)

(52) U.S. Cl.
  CPC ........... G06Q 30/0255 (2013.01); G06N 5/04 (2013.01); G06Q 30/0201 (2013.01); G06Q 30/0242 (2013.01); G06Q 30/0276 (2013.01); H04L 67/02 (2013.01); *G06Q 30/0247* (2013.01); *G06Q 30/0273* (2013.01)

(58) Field of Classification Search
  CPC ........... G06Q 30/0255; G06Q 30/0201; G06Q 30/0242; G06Q 30/0276; G06Q 30/0247; G06Q 30/0273; G06N 5/04; H04L 67/02
  USPC ......................................................... 725/116
  See application file for complete search history.

(56) References Cited

U.S. PATENT DOCUMENTS

| | | | |
|---|---|---|---|
| 2006/0015904 A1* | 1/2006 | Marcus | G11B 27/034 725/46 |
| 2009/0022165 A1* | 1/2009 | Candelore | H04L 12/28 370/400 |
| 2010/0223093 A1* | 9/2010 | Hubbard | G06Q 30/0251 705/7.32 |
| 2010/0223637 A1 | 9/2010 | Hubbard | |
| 2019/0019213 A1* | 1/2019 | Silberman | G06Q 30/0243 |

* cited by examiner

*Primary Examiner* — Alfonso Castro
(74) *Attorney, Agent, or Firm* — William J. Benman; Benman, Brown & Williams

(57) ABSTRACT

An artificially intelligent network for ad campaign design and distribution having a first subsystem for receiving and storing permission to receive targeted content; a second subsystem for selecting recipients for the content; a third subsystem responsive to the second subsystem for distributing the content; and a fourth subsystem for confirming the viewing of the content. In the illustrative embodiment, the system further includes a subsystem for creating as well as receiving the content. The system provides an artificially intelligent campaign creation and deployment system with an advertiser interface; a subscriber interface; and a targeting system for creating, deploying and monitoring an advertising campaign using inputs received via the advertiser and subscriber interfaces and a unique targeting system. The targeting system comprises first arrangement for receiving a first data set with user permissions and preference data; second arrangement for receiving a second data set based on demographic data; and third arrangement for correlating the first data set with the second data set to provide a third data set optimized with respect to at least one parameter. In an illustrative embodiment, the second arrangement further includes arrangement for receiving and factoring in historical and trending data and the parameter is return on investment.

5 Claims, 11 Drawing Sheets

CAMPAIGN CREATION AND OPERATION SYSTEM

ARTIFICIALLY INTELLIGENT CAMPAIGN CREATION AND DEPLOYMENT SYSTEM

REFERENCE TO RELATED APPLICATION

This application claims priority from U.S. patent application Ser. No. 16/814,746, filed Mar. 10, 2020, by R. B. Hubbard and entitled SYSTEM AND METHOD FOR DISTRIBUTING MULTIMEDIA CONTENT VIA TELEVISION AND MOBILE WIRELESS PLATFORMS.

BACKGROUND OF THE INVENTION

Field of the Invention

The present invention relates to electronic circuits and systems. More specifically, this invention relates to collections of circuits to provide artificially intelligent systems.

Description of the Related Art

U.S. patent application Ser. No. 16/814,746, filed Mar. 10, 2020, by R. B. Hubbard entitled SYSTEM AND METHOD FOR DISTRIBUTING MULTIMEDIA CONTENT VIA TELEVISION AND MOBILE WIRELESS PLATFORMS, the teachings of which are hereby incorporated herein by reference, substantially addresses the need in the art for a system for extending the utility and functionality of the Hubbard system described in U.S. Pat. No. 10,169,780, issued Jan. 1, 2019 to R. B. Hubbard and entitled a *System and Method For Transmitting and Receiving Multimedia Content*, the teachings of which are incorporated herein by reference, to television networks and markets.

However, a further need has been recognized in the art for improvements in the communications infrastructure by which the Hubbard system is able to operate on television, mobile and gaming platforms. Specifically, a further, a need exists in the art for a system and method for creating and executing advertising campaigns for use with the Hubbard system.

SUMMARY OF THE INVENTION

The need in the art is addressed by the present invention which provides an artificially intelligent network designed to manage most aspects of the Hubbard system. Specifically, the present invention provides an artificially intelligent system having a first subsystem for receiving and storing permission to receive targeted content; a second subsystem for targeting recipients for the content; a third subsystem responsive to the second subsystem for distributing the content; and a fourth subsystem for confirming the viewing of the content.

In the illustrative embodiment, the content is advertising content and the system further includes a subsystem for creating as well as receiving the content. In an alternative embodiment, the content is regular content (i.e., content other than advertising content) and the system further includes a subsystem for creating as well as receiving the content.

The system provides an artificially intelligent campaign creation and deployment system with an advertiser interface; a subscriber interface; and a targeting system for creating, deploying and monitoring an advertising campaign using inputs received via the advertiser and subscriber interfaces and a unique targeting system. The targeting system comprises first arrangement for receiving a first data set with user permissions and preference data; second arrangement for receiving a second data set based on demographic data; and third arrangement for correlating the first data set with the second data set to provide a third data set optimized with respect to at least one parameter. In an illustrative embodiment, the second arrangement further includes arrangement for receiving and factoring in historical and trending data and the parameter is return on investment.

The inventive system provides a method for creating and targeting advertisements including the steps of receiving a first data set with user preference data; receiving a second data set based on advertiser preferences; and correlating the first data set with the second data set to provide a third data set optimized with respect to at least one parameter.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
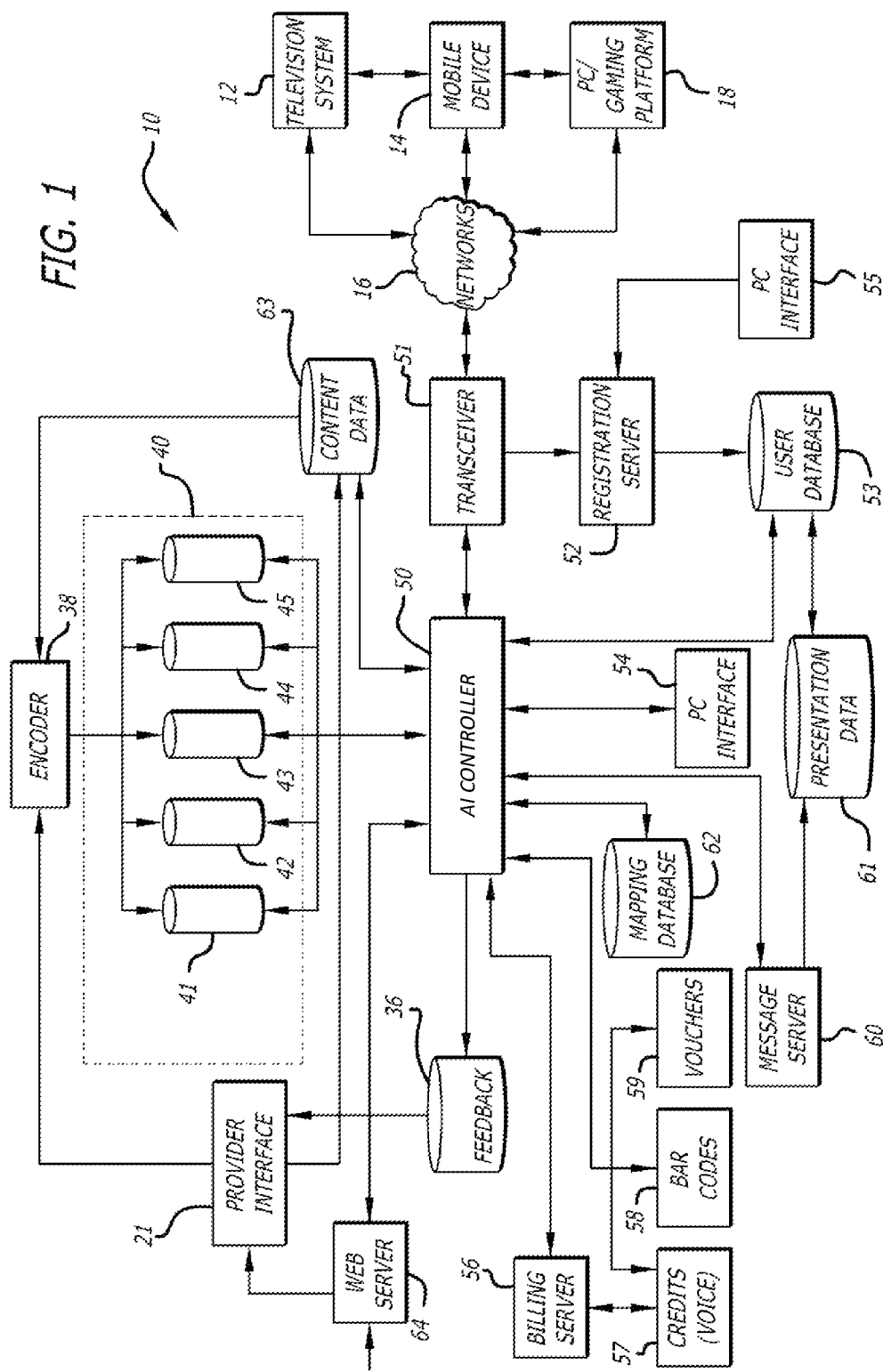
FIG. 1 is a block diagram showing an illustrative hardware implementation of a system for multimedia in accordance with the present teachings.

FIG. 1 is a block diagram, which shows an illustrative implementation of a system for distributing multimedia content in accordance with the teachings of the present invention. As shown in FIG. 1, the system 10 includes an encoder 38, which receives multimedia content via an interface 21. The interface 21 is a provider interface connected to the web via a web server 64. As an alternative, the content may be provided via a disk or other means. The encoder 38 encodes and compresses the content and stores the content in a hub 40. For example, a 10-30 second file might be compressed into 150-300 kilobyte packets. The hub 40 is a storage facility such as a bank of content servers. The hub 40 is shown with five servers 41-45. However, those skilled in the art will appreciate that the invention is not limited to the number of servers used.

The hub 40 is operationally coupled to a controller 50 which, in accordance with the present teachings, serves, inter alia, as an artificially intelligent campaign creation, targeting and execution system as discussed more fully below.

In a manual mode, a schedule may be input locally or via the web using a PC interface 54. The system 10 further includes a feedback database 36 for storing data relating to user responses to locally generated content as discussed more fully below.

A registration server 52 is included to store user data (registration and preferences) in a user database 53. This data may be received over the web from users via the user's PC interface 55. An optional billing server 56 is coupled to the controller as well. The billing server 56 also communicates with optional credit, bar code and voucher servers 57, 58 and 59. A message server is coupled to the controller 50 and provides messages related data. A mapping database 62 is included for location-based services as discussed herein. A content database 63 serves to store advertiser uploaded ads.

As discussed more fully below, the controller 50 transmits advertising and other content via a transceiver 51 to one or more selected platform units including a television platform 12, a smartphone platform 14 and/or a PC gaming platform 18.

Figure 2:
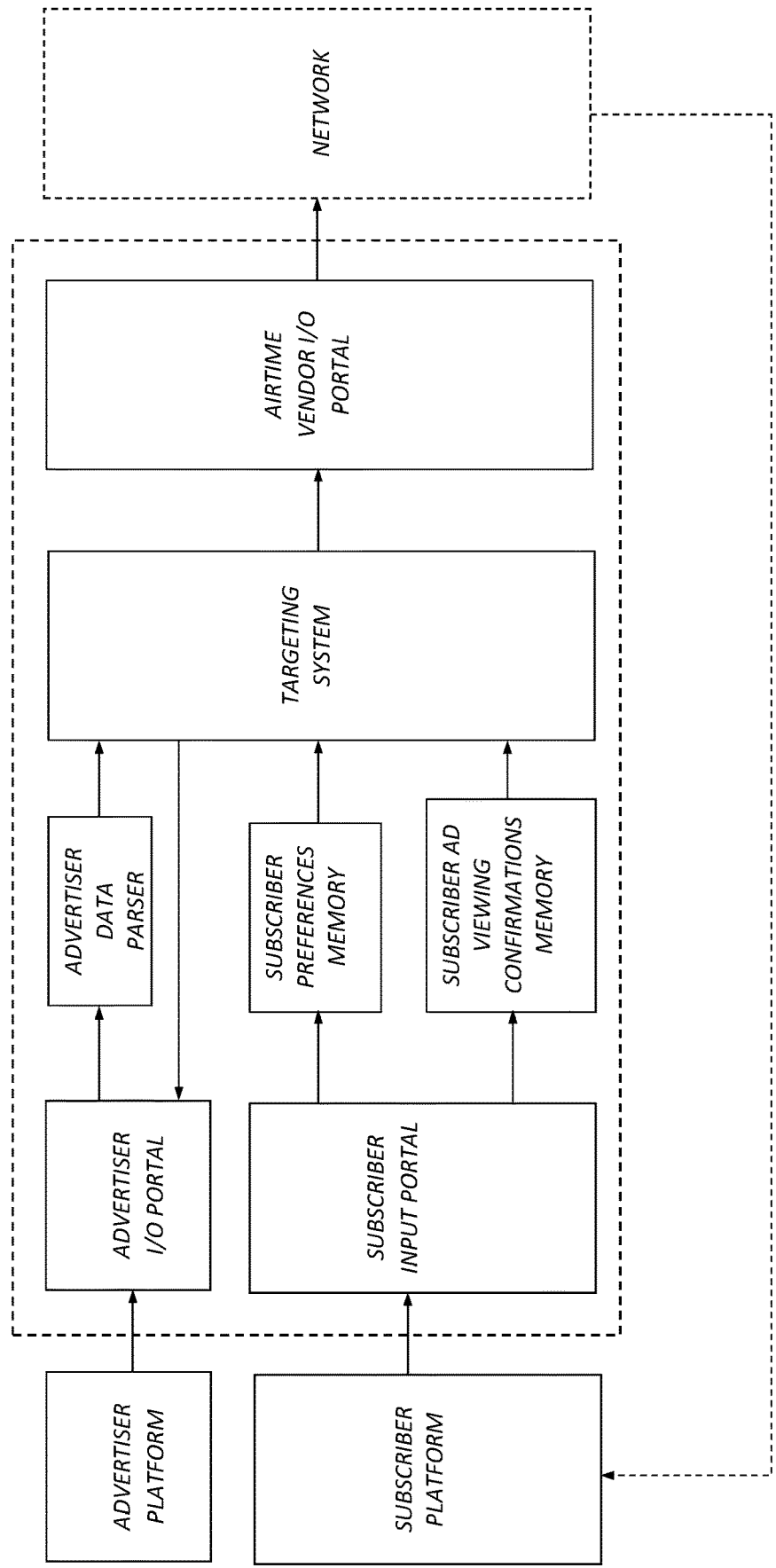
FIG. 2 is a block diagram of an illustrative embodiment of the controller depicted in FIG. 1.

FIG. 2 is a block diagram of an illustrative embodiment of the controller depicted in FIG. 1. As shown in FIG. 2, the controller includes a targeting system that receives inputs from an advertiser platform via an advertiser I/O portal and an advertiser data parser. The data parser is a(n) algorithm that serves to refine the content output of the advertiser. The targeting system receives inputs from subscribers via subscriber platforms and a subscriber input portal. In the illustrative embodiment, the advertiser and subscriber platforms may be mobile or stationary general purpose computing platforms. The subscriber and advertiser portals may be implemented via the Internet or another networking system.

Subscriber preferences are stored in a first memory area while subscriber ad viewing confirmations are stored in a second memory area shown as a 'confirmations' memory. These memory units along with the data parser are operationally coupled to the targeting system. As discussed more fully below, the targeting system outputs campaign programming and control data to an airtime vendor I/O portal from which it is forwarded to an appropriate network for broadcast or transmission.

Figure 3:
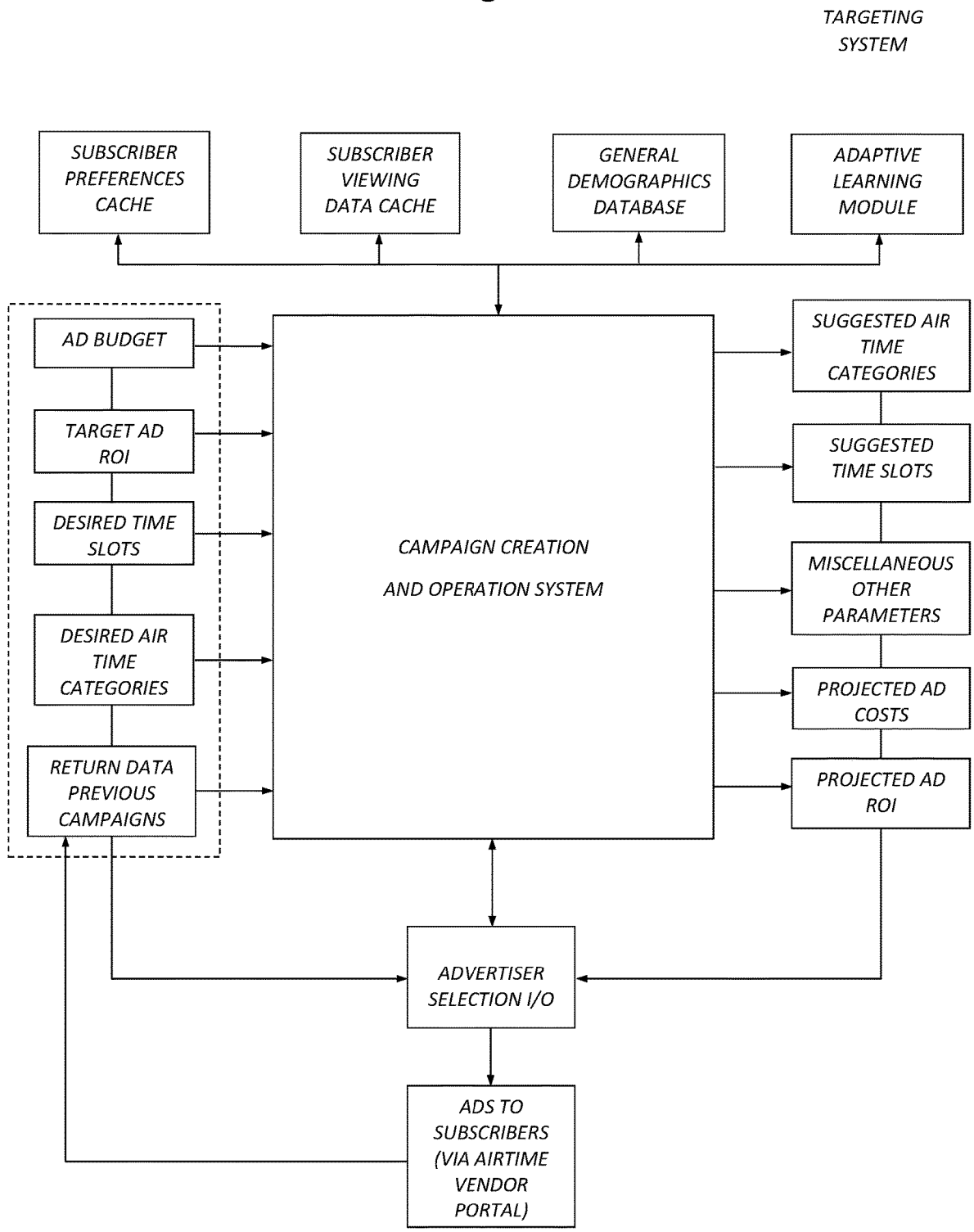
FIG. 3 is a block diagram of an illustrative embodiment of the targeting system of the controller depicted in FIG. 2.

FIG. 3 is a block diagram of an illustrative embodiment of the targeting system of the controller depicted in FIG. 2. As shown in more detail in FIG. 3, the targeting system includes a campaign creation and operation system that performs audience selection and targeting based on static (initial) and dynamic (subsequent) user preferences, user shopping history, prior campaign results, demographics, internet trends, and other AI processing data. The campaign creation system utilizes these inputs to run simulations to find an optimal solution based on advertiser return on investment (ROI), speed, market penetration, scope and/or any other parameters selected by the advertiser or system administrator considering advertiser ad budget, target ad ROI, desired time slots, desired airtime categories and return data. This information is utilized along with the static and dynamic subscriber preferences from the subscriber cache, subscriber viewing history from the subscriber viewing data cache, general demographics from a local or remote market research database and feedback from an adaptive learning module to output suggested airtime categories, time slots, projected ad costs and projected ad (advertisement) ROI to the advertiser for selection. The selected campaign is then output to subscribers via a selected airtime vendor portal. The AI campaign creation and operation system provides real time campaign suggestions and adjustments in campaign content, duration and targeting during the campaign.

Figure 4:
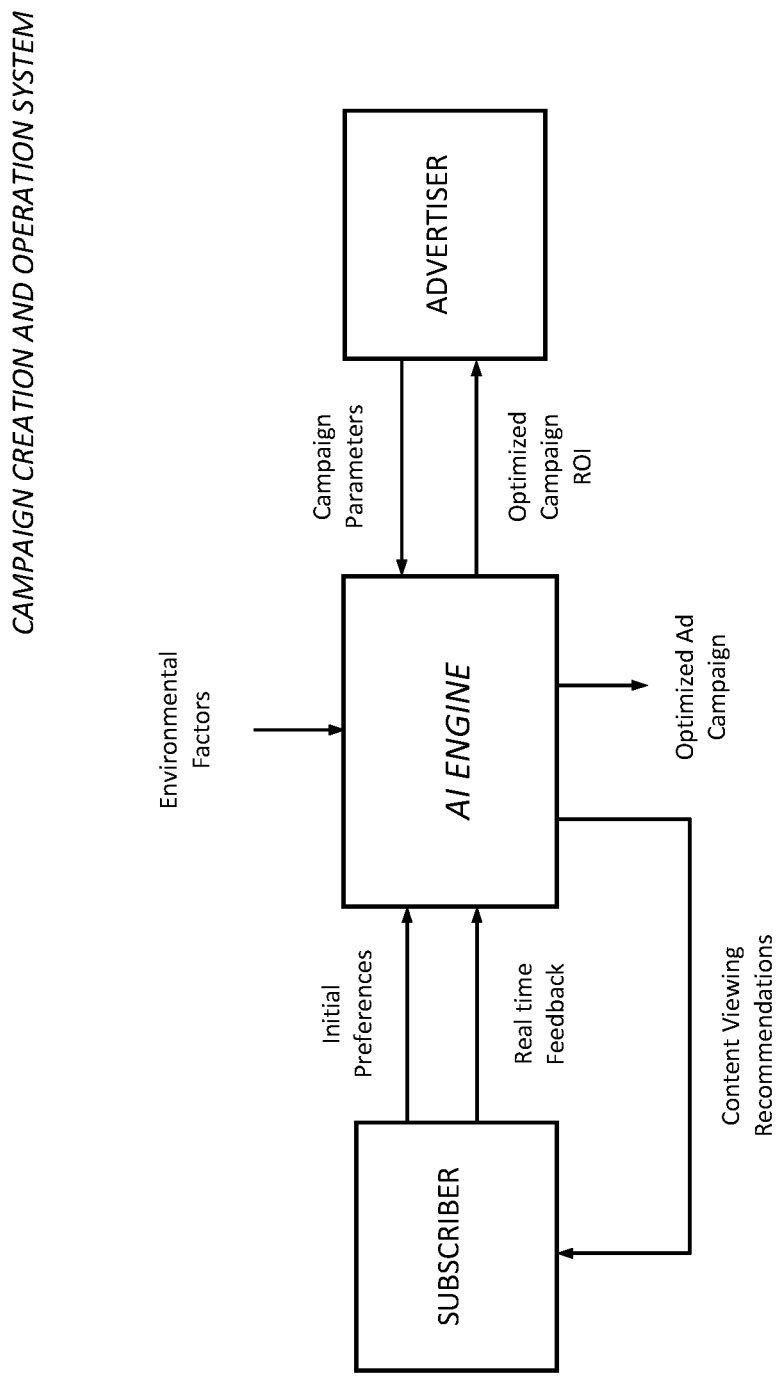
FIG. 4 is a block diagram of an illustrative embodiment of the campaign creation and operation system of the targeting system depicted in FIG. 3.

FIG. 4 is a block diagram of an illustrative embodiment of the campaign creation and operation system of the targeting system depicted in FIG. 3. As depicted in FIG. 4 and discussed more fully below, those of ordinary skill in the art will appreciate that the campaign creation and operation system serves as an AI engine that processes subscriber preferences, advertiser selected parameters, and environmental or ecosystem factors to output an optimized ad campaign as an alternative to and in addition to manual ad campaign design.

Figure 5:
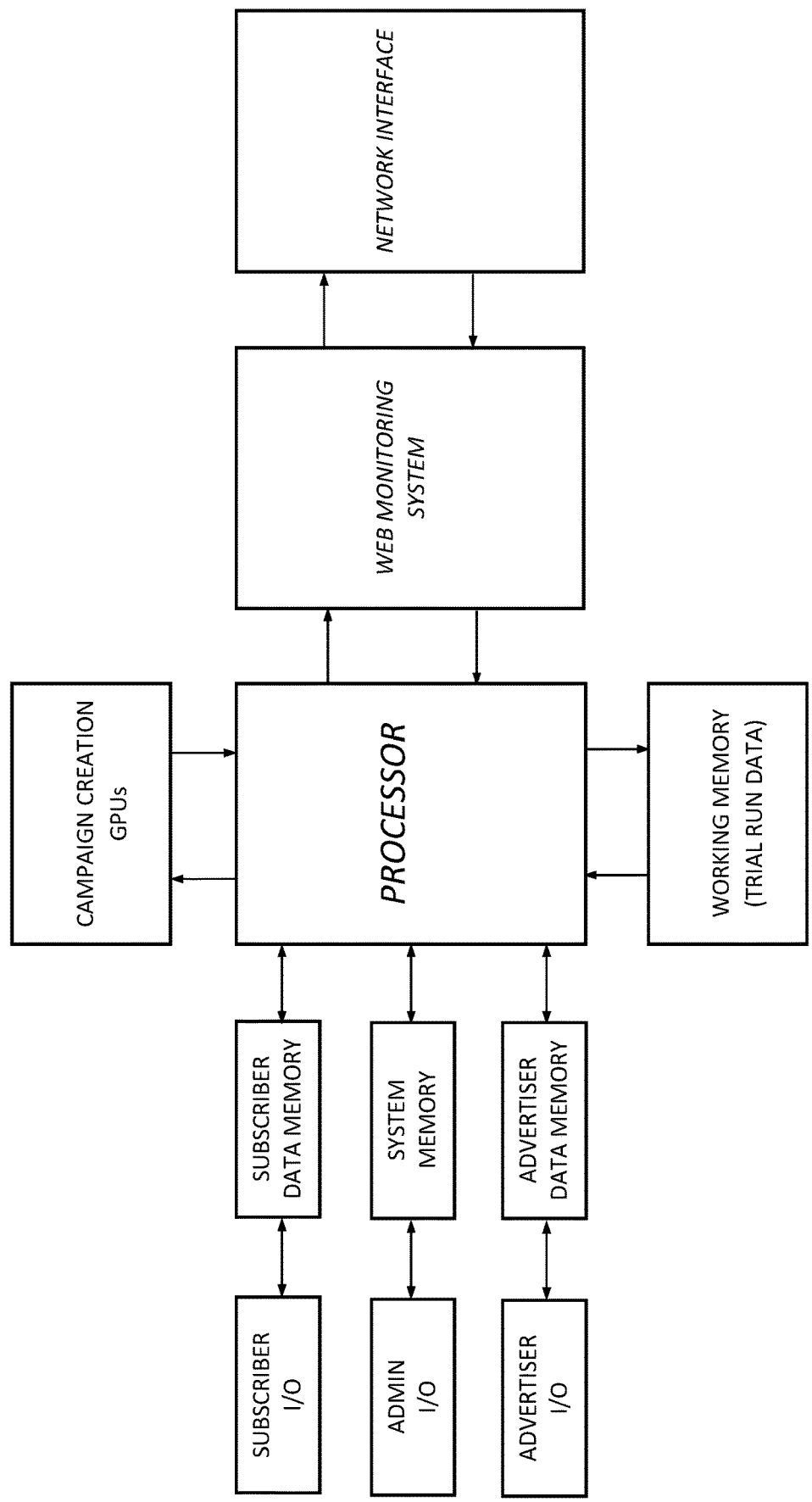
FIG. 5 is a block diagram showing an illustrative embodiment of the artificial intelligence engine depicted in FIG. 4.

FIG. 5 is a block diagram showing an illustrative embodiment of the artificial intelligence engine depicted in FIG. 4. As shown in FIG. 5, the AI engine is implemented with a processor adapted to execute software stored in non-transient system memory on data supplied by subscriber memory, advertiser memory, a web monitoring module, and working memory to output manual and AI created ad campaigns via a network interface. When AI advertisements (hereinafter 'ads') are being created virtually or otherwise by the system, the ads may be displayed to the advertisers via a campaign creation general processing unit of conventional design and operation.

FIG. 6(*a-f*) is a flow diagram showing an illustrative embodiment of a method for creating and distributing targeted advertisements in accordance with the present invention. As shown in FIG. 6(*a*), the system is starts by prompting an advertiser to enter a registration and verification process by which the advertiser sets up an account and uploads ad content, if any, for distribution.

Next, the advertiser initiates an advertising campaign by choosing manual mode or AI ad creation mode.

Manual Mode:

As shown in FIG. 6(*b*), in manual mode, the advertiser is prompted by the inventive system to enter a campaign offer (e.g., discount coupon or voucher) the duration of the campaign, the terms and conditions (e.g., how long the coupon or voucher offer is valid and any other terms or conditions in which it would expire or not be valid) and a link, if desired, to a website to purchase product, with or without a QR or bar code. In addition, an ad name, ad caption, offer details, a thumbnail of the ad may be entered and the ad may be uploaded to the database Multimedia (i.e., audio/video) ads are uploaded by the advertiser to the content database 63 of FIG. 1.

As shown in FIG. 6(*c*), in manual mode, the advertiser then selects audience by age for the ad, location of broadcast (country, region, zip code, etc.) gender and income range of recipient.

Next, the brand or product is associated or matched with subscriber interest by category. This information is "Subscriber Preferences' and provided by Subscribers at time of registration. It may include such information as: General, Music, Sports, Food, Movies, Fashion, Health Gaming, Interest Categories, etc. by way of example.

Next, the advertiser is presented with an option to broadcast the ad without regard to subscriber interest. Days the ad will run along with time of day are specified. The system then displays the size of the audience selected by the advertiser, based on subscriber registration data, and displays the amount to be paid by the advertiser based on the selected campaign parameters.

Figure 6A:
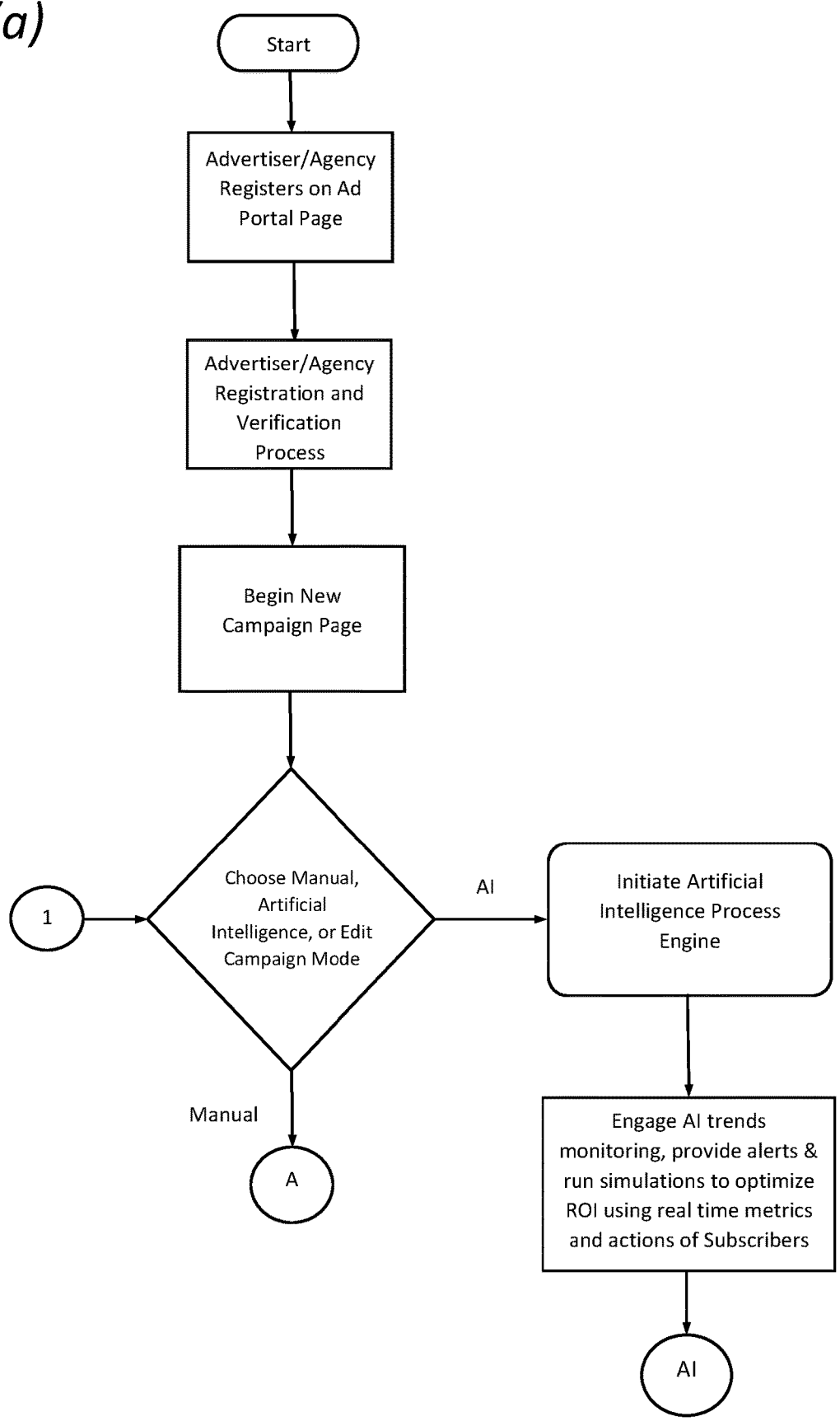
FIG. 6(*a-f*) is a flow diagram showing an illustrative embodiment of a method for creating and distributing targeted advertisements in accordance with the present invention.
Figure 6B:
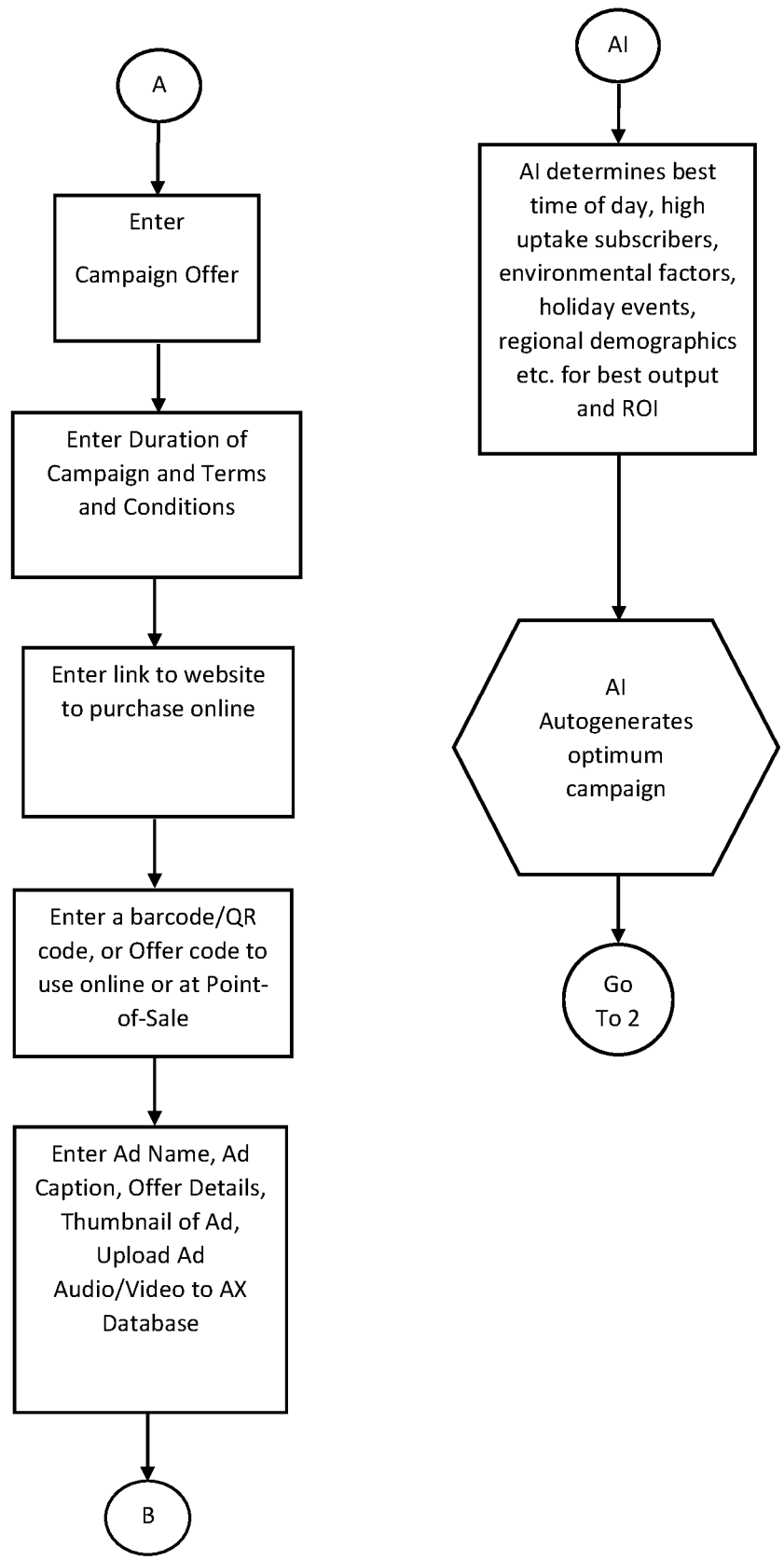
Figure 6C:
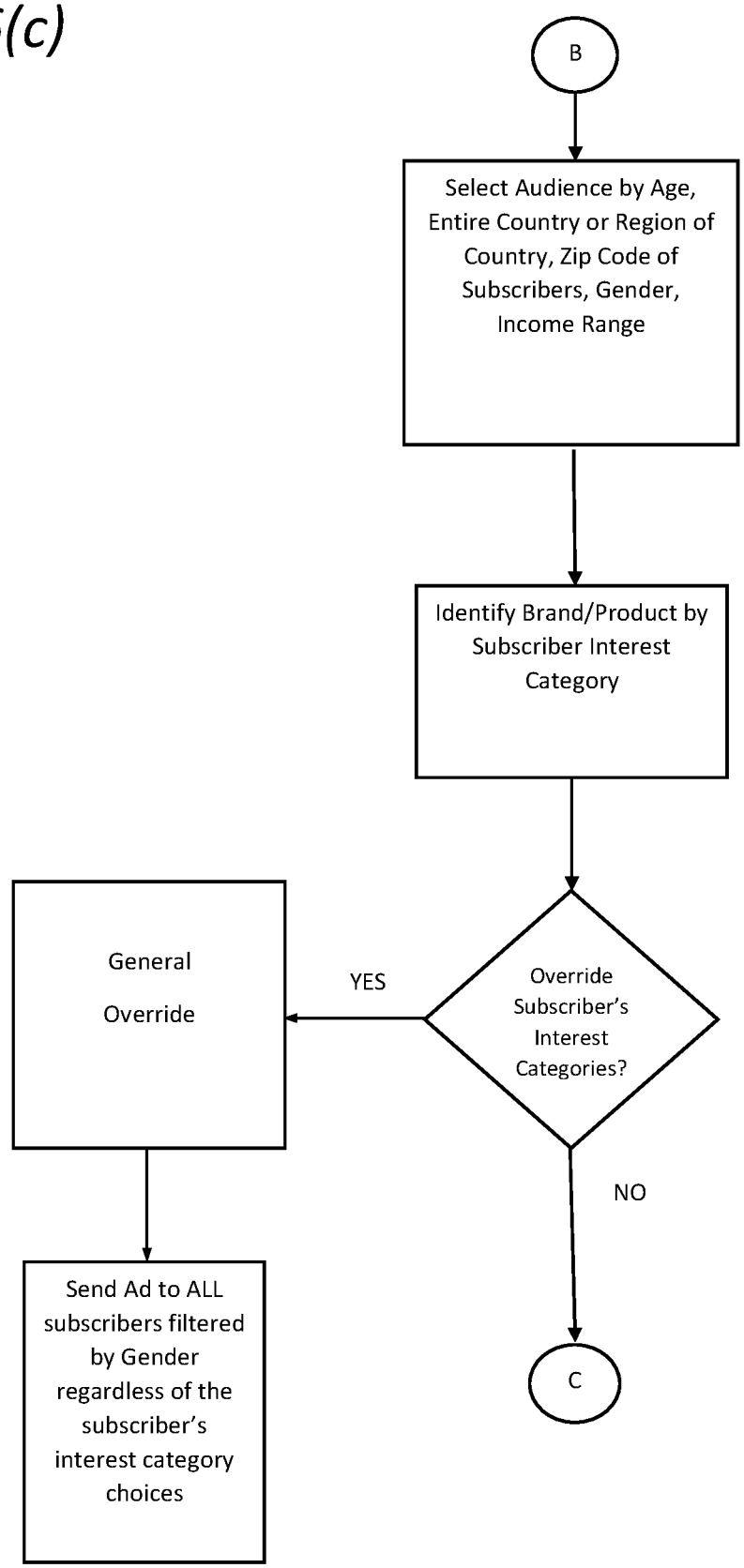
Figure 6D:
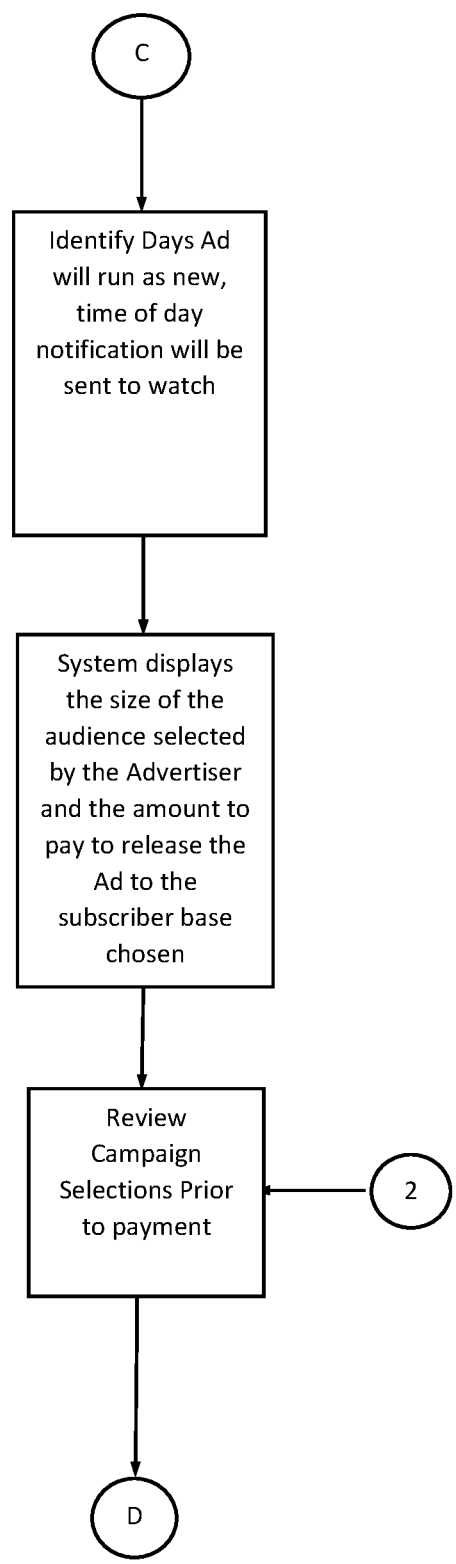
Figure 6E:
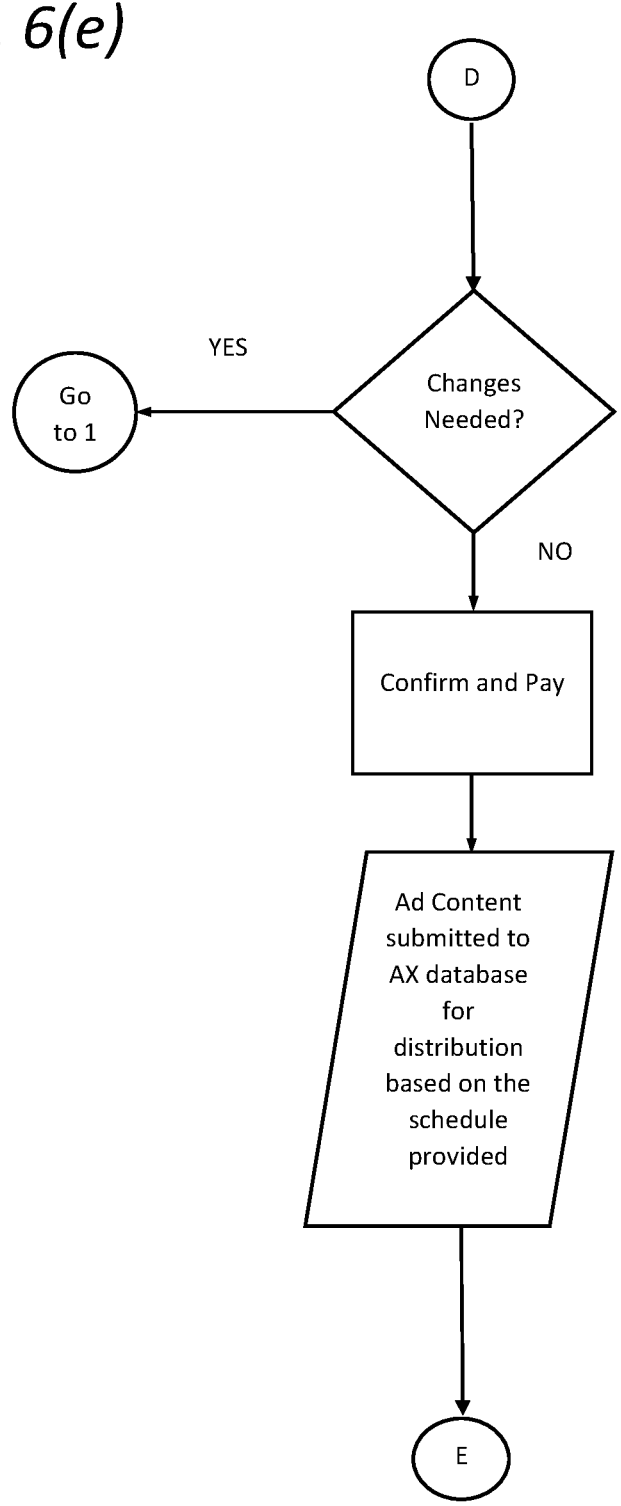

The campaign selections are reviewed for payment, changes are made if needed (FIG. 6(e)), payment is made and the selected ad content is submitted to the database encoder hub 40 for distribution in accordance with the selected schedule.

Figure 6F:
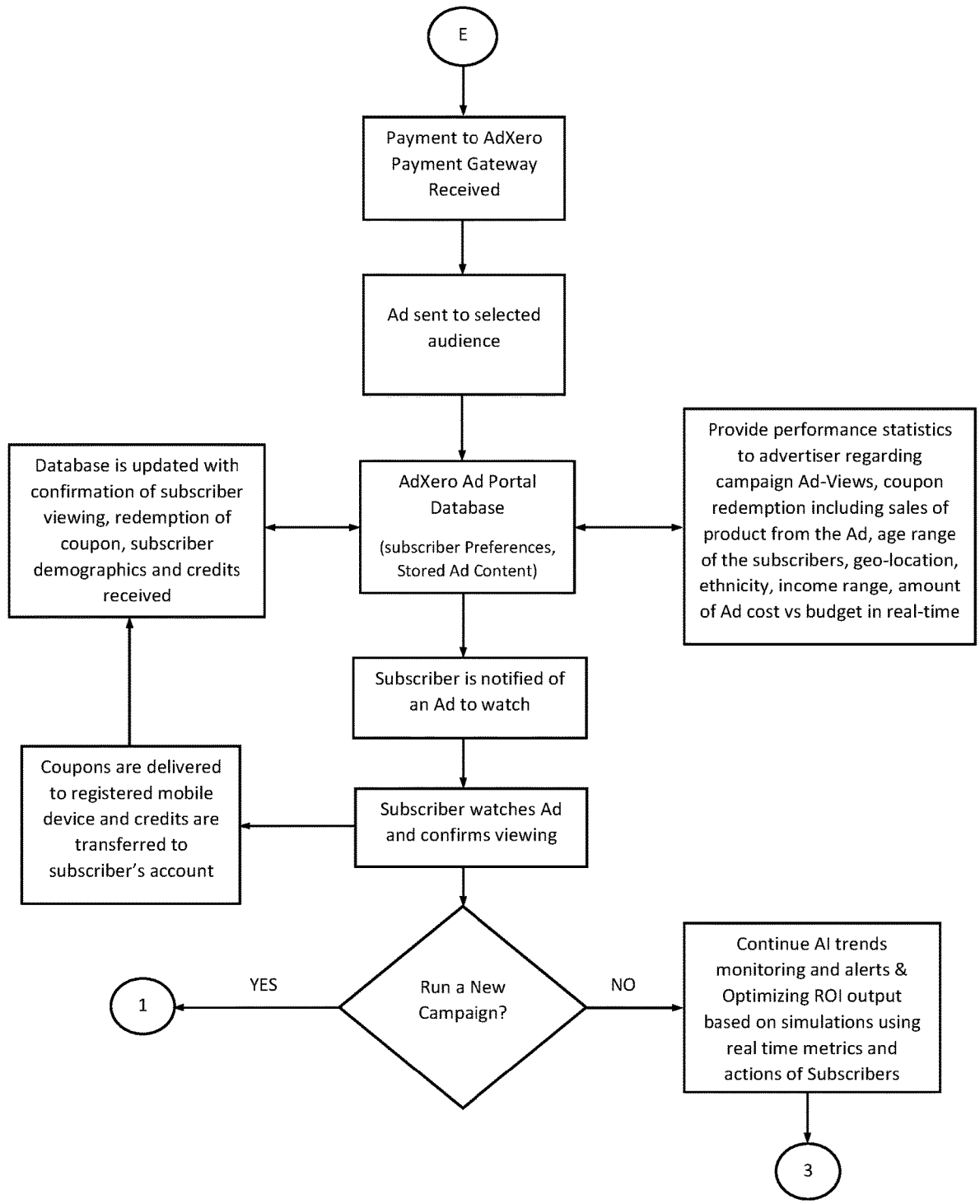

As depicted in FIG. 6(f), upon receipt of payment (e.g., authorization to charge the advertiser's account), the ad is sent to the selected audience via the AdXero® ad portal database.

The selected subscribers are notified of receipt, on the subscriber platform, of an ad to watch. The subscriber then watches the ad and confirms viewing. Confirmation of view is transmitted back to the targeting system as depicted in FIG. 2.

Coupons are delivered to the subscriber's platform (mobile device, PC, television etc.) and credits are transferred to the subscriber's account. The subscriber viewing data is uploaded to the user database 53 of FIG. 1 and the subscriber viewing data cache of FIG. 3.

Finally, as depicted in FIG. 6(f), performance statistics are sent to the advertiser by the presentation data of the AdXero ad portal 61 of FIG. 1 regarding campaign ad views, coupon redemption, sales of product, age range of subscribers, geo-location, ethnicity, income range, ad cost vs. budget and ad ROI all in real time.

AI Mode:

Returning to FIG. 6(a), if the advertiser selects artificial intelligence (AI) mode, the AI engine is utilized to select and/or create an ad campaign that has the highest probability of achieving a threshold metric selected by the advertiser. Presumably, this metric is return on investment (ROI) with respect to ad cost divided by sales revenue but the invention is not limited thereto. That is, the metric might be total sales, total viewing, successful market penetration, etc. without departing from the scope of the present teachings.

In any event, the AI engine runs multiple simulations using data from local and remote databases, search engines, social media, holidays, weather, current events, geographics, seasonal events, ethnic and gender recognition, historical events and studies and networks that yield data regarding trends, campaign history, advertising market and economic theory along with real time metrics (ad and product cost ((promotional discounts, etc.)) and pricing recommendations), history from previous campaigns and actions of subscribers to yield predictions based on selected metrics. Those of ordinary skill in the art will appreciate that additional information can be provided to the AI engine and it can be configured to provide additional outputs without departing from the scope of the present teachings.

Next, as depicted in FIG. 6(b), the most optimal simulation selected by the AI engine yields the best time of day for the ad considering environmental factors, holidays, regional demographics and culture etc.

Thus, the AI autogenerates the optimum campaign and offers to create the ad content to the advertiser. However, those skilled in the art will appreciate that the present invention is not limited to the creation and distribution of ads only. Any content can be created and distributed utilizing the present teachings without departing from the scope of the present invention.

The inventive AI based system is designed to monitor news, weather and social media to determine optimum time slots for ads created to target a particular demographic and then notify an advertiser of the opportunity and/or create the ad and/or store a database of ads created by a community of ad content creators and offered for broadcast for a fee to the platform and with the understanding that the advertisers will pay for the content or share revenue and subsequently handle communications between advertisers and ad creators automatically push out the targeted ad in response to an approval from the advertiser. This creates a portal where bloggers and celebrities and others can contribute ads and makes ads target ads available on demand for use within the opportunity window.

In any event, as shown in FIG. 6(d), the AI generated campaign is presented to the advertiser for approval and the system operates as discussed above with respect to the manual mode of operation from this point forward.

Those having ordinary skill in the art and access to the present teachings will recognize additional modifications, applications and embodiments within the scope thereof.

It is therefore intended by the appended claims to cover any and all such applications, modifications and embodiments within the scope of the present invention.

The invention claimed is:

1. An artificially intelligent campaign creation and deployment system comprising:
   an advertiser interface;
   a subscriber interface;
   a processor operationally coupled between the advertiser interface and the subscriber interface and
   software stored in a tangible medium for execution by the processor including code for implementing an automated campaign creation and operation system for autogenerating deploying and monitoring an advertising campaign using inputs received via the advertiser and subscriber interfaces; running simulations in response thereto and quantitatively evaluating the simulations with respect to a predetermined metric,
   whereby the system provides a controller with a targeting system having a campaign creation and operation system with an artificially intelligent engine implemented by the processor and software to run multiple simulations using data from local and remote databases, search engines, social media regarding holidays, weather, current events, geographics, seasonal events, ethnic and gender recognition, historical events and studies and networks that yield data regarding trends, campaign history, advertising market and economic theory along with real time metrics, ad and product cost, promotional discounts, pricing recommendations, history from previous campaigns and actions of subscribers to yield predictions based on predetermined metrics.

2. The system of claim 1 further including code for automatically creating advertising content pursuant to each campaign simulation.

3. The system of claim 1 wherein the engine further includes code designed to monitor news, weather and social media to determine optimum time slots for ads created to target a particular demographic.

4. The system of claim 1 wherein the metric is return on investment.

5. The system of claim 4 wherein the system for monitoring trends includes a web monitoring system.

* * * * *